United States Patent [19]

Erb

[11] Patent Number: 4,629,018
[45] Date of Patent: Dec. 16, 1986

[54] ELECTRICAL BALANCE WITH ACOUSTIC FEEDBACK SIGNAL FOR MANUAL DOSING OR MIXING

[75] Inventor: Karl J. Erb, Gossau, Switzerland

[73] Assignee: Mettler Instruments AG, Greifensee-Zurich, Switzerland

[21] Appl. No.: 730,807

[22] Filed: May 6, 1985

[30] Foreign Application Priority Data

May 8, 1984 [CH] Switzerland ................ 2255/84

[51] Int. Cl.⁴ ............... G01G 23/18; G01G 23/00
[52] U.S. Cl. ........................... 177/47; 177/245; 364/567
[58] Field of Search .................. 177/45–47, 177/177, 245; 364/567

[56] References Cited

U.S. PATENT DOCUMENTS

| 2,492,257 | 12/1949 | Barton | 177/47 X |
| 3,155,182 | 11/1964 | Rackman | 177/45 |
| 4,076,088 | 2/1978 | Gallo et al. | 177/177 X |
| 4,294,320 | 10/1981 | Bilstad et al. | 364/567 X |

FOREIGN PATENT DOCUMENTS 2729380 5/1978 Fed. Rep. of Germany.
2363731 7/1980 Fed. Rep. of Germany.

Primary Examiner—George H. Miller, Jr.
Attorney, Agent, or Firm—Erwin S. Teltscher

[57] ABSTRACT

An electronic scale controlling a material feed generates a control signal as the material fed approaches a desired weight. An acoustic tone signal varying in accordance with the control signal and reaching a limiting value when the control signal signifies a zero difference between actual weight and desired weight lets an operator know that desired weight has been achieved.

11 Claims, 2 Drawing Figures

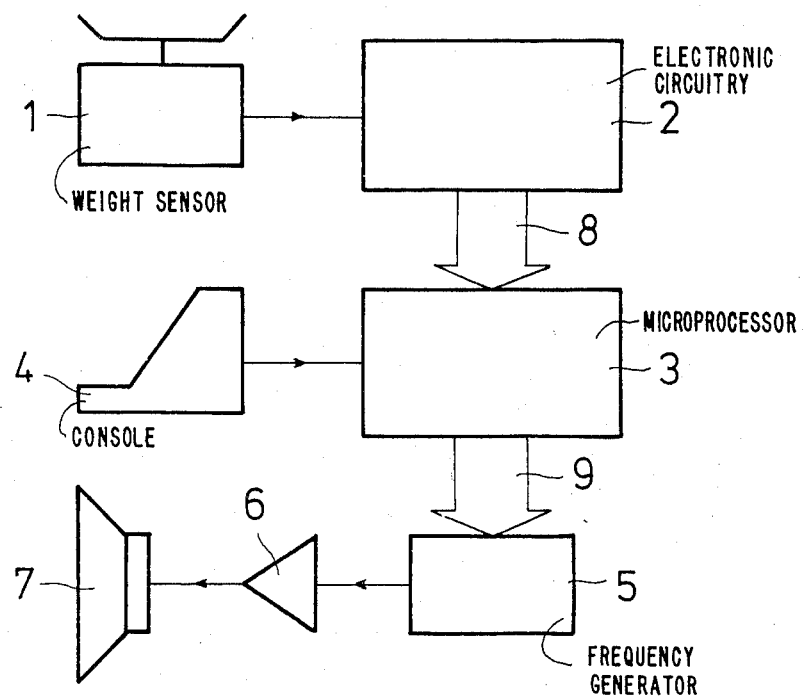
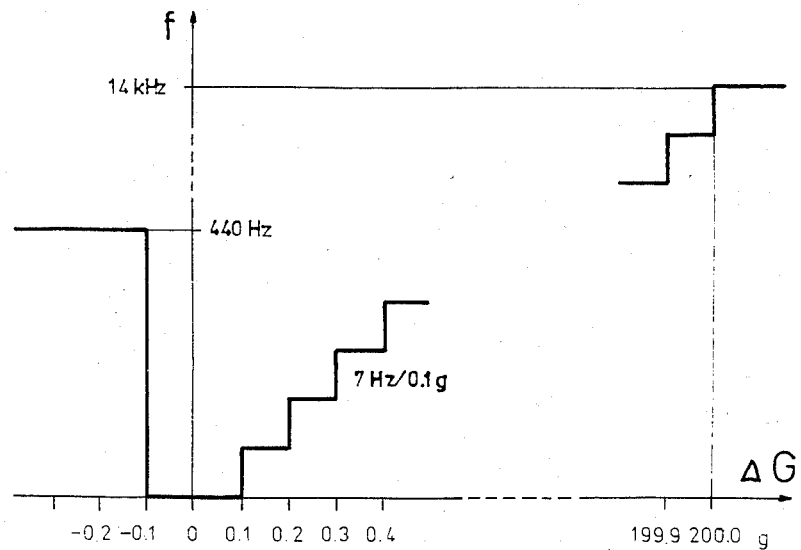

ELECTRICAL BALANCE WITH ACOUSTIC FEEDBACK SIGNAL FOR MANUAL DOSING OR MIXING

FIELD OF THE INVENTION

The present invention relates to acoustic indicators for electrical balances in which the measured weight is indicated by electrical and, more particularly digital, signals. Acoustic indicators are particularly useful when metering substances, particularly in manual dosing or mixing processes.

BACKGROUND OF THE INVENTION

It is well known that instantaneous or limiting values of a measured quantity may be indicated acoustically. In particular, an acoustic indicator has been proposed (DE-PS 2363731) for portable measuring and warning apparatus for measuring exposure to radiation. Such units may be clipped on to clothing and furnish a rough indication of the instantaneous value of the measured quantity. They can also generate a warning tone when the measured quantity exceeds a limiting value. The measured value may, for example, be indicated by different frequencies or by a different sequence in time of acoustic pulses. Acoustic limit indicators have been proposed for electrical measuring instruments (U.S. Pat. No. 4,321,530), torque meters (U.S. Pat. No. 4,244,434) and meters for controlling the axle load of trucks (DE-OS 2729380). In all of these, an acoustic signal is generated when the quantity being measured exceeds the predetermined limiting value.

SUMMARY OF THE INVENTION

It is an object of the present invention to furnish an acoustic indicator which so guides the operator carrying out the weighing operation that her or his full attention can be focused on metering the substance, i.e. no reference has to be made to the optical display until the desired weight has been reached.

Using the basic principles set forth in German Patent 2363,731, the apparatus of the present invention combines the desired value and the then-present value of the weight of the substance being metered and generates a control signal varying in accordance with the difference between these two values. The control signal is applied to a tone generator, a characteristic value of which changes in dependence on the control signal applied thereto.

In a preferred embodiment, the control signal generator is a microprocessor which is connected to the data output of the balance and which is further connected to a console on which the desired weight value can be entered by an operator.

The tone signal generator is, preferably, a programmable square wave generator having a digitally controllable period. The output of the tone generator is connected to a speaker via an amplifier. When a variable frequency is used as a measure for the weight difference, a square wave signal must be used so that harmonics of the signal are audible even at the lowest frequencies.

In a preferred mode of operation, the tone generator is so controlled that the frequency of its output varies downwardly from an upper limiting value as the difference between the desired and the actual weight values decreases. When the difference passes through zero, that is when the desired weight has been reached, the tone signal reaches an inaudible value (zero frequency). This method of operation utilizes the logarithmic frequency response of the human ear so that the desired increase in accuracy occurs towards the end of the metering process; that is, frequency differences are more ascertainable as the desired weight value is approached. At the very low frequencies of a square wave acoustic signal, the human ear hears more the period than the frequency and this parameter changes from 140 msec (due to the 7 Hz increments in our application) to infinity. In other words, the sound changes from a very distinct periodic "clicking" (clearly audible even under loud ambient noise) to silence. If it is impossible to set a period of infinite length, a complete silence as the difference signal goes through zero can be achieved by using an inaudible high frequency.

It is further desirable to limit changes in the characteristic value of the tone signal to only the final part of the metering or dosing process. For example, at the start of the metering process, the frequency of the tone has an upper limiting value which is maintained until the difference between the actual and desired weight reaches a predetermined fraction of its initial value. When this predetermined fraction is reached, the change in frequency commences. Thus the total usable frequency range is utilized for a relatively small weight range, thereby further increasing the sensitivity of the acoustic indicator.

When the tone generator is digitally controlled, changes in the characteristic value of the signal, for example changes in its frequency, can take place in a stepwise manner. These steps can correspond to the resolution of the digital display of the balance.

It may also be desirable to generate a warning signal when the desired weight value has been exceeded. This too can be a tone having a predetermined constant frequency, though of course not the same frequency as that with which the weighing process is commenced.

Of course other characteristics of the tones than the frequency thereof can be used to indicate the weight differences. For example, a timed sequence of tone pulses may be used. Additionally, different parts of the weighing process may have a different characteristic values of the acoustic indication assigned to them. A combination of frequency changes and changes of other characteristic values can also be used.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

FIG. 1 is a block diagram of an electrical balance having an acoustic indicator; and FIG. 2 shows the variation of frequency in dependence on the difference between the desired and actual weights for an acoustic indicator illustrated in FIG. 1.

DESCRIPTION OF THE PREFERRED EMBODIMENTS

In FIG. 1, a balance is illustrated which, in the main, is constituted by a weighing cell 1 and electronic apparatus 2 for generating an electrical display signifying the weight on the balance. The acoustic indicator, which is to be used when substances are being metered, includes a microprocessor 3, a console 4, a tone generator 5, an amplifier 6 and a speaker 7.

The electronic apparatus 2 of the balance has an output at which electrical signals controlling the optical display are available. Microprocessor 3 is connected to this output through a bus 8. It is further connected to console 4 which allows the desired weight value to be entered or inputted in the form of an electrical signal. In microprocessor 3, the difference between the entered desired value and the then-present value of the weight on the scale is computed and a control signal corresponding to this difference value is generated. This control signal is applied to tone signal generator 5. The tone generated by the tone signal generator is applied to speaker 7 through amplifier 6.

Tone generator 5 is a programmable square wave generator with a digitally controllable period. It is connected to microprocessor 3 through a bus 9. Microprocessor 3 and tone signal generator 5 may be constituted by integrated circuit blocks such as Rockwell type 6502 and 6522.

In FIG. 2, the variation of the frequency f of the tone as a function of the difference in weight between the target weight and the desired weight, $\Delta G$ is illustrated. In this embodiment a balance has a range of zero to four thousand grams and a resolution of 0.1 gram. As can be seen in the diagram, the change in frequency is restricted to the range of from zero to two hundred grams of the difference weight $\Delta G$. As long as the difference in weight is more than two hundred grams, a control tone having a frequency of 14 kHz is to be heard. As the difference weight decreases below two hundred grams, the frequency of the tone decreases stepwise down to zero, the steps being 7 Hz/0.1 grams: The range in which the frequency decreases linearly with the weight difference could be reduced in order to lower the control tone of 14 kHz to a more clearly audible frequency (10–12 kHz). A tolerance region of $-0.1$ to $+0.1$ of a gram around a zero difference value is provided. No tone can be heard in this region which, in addition, may be increased or decreased as appropriate. Preferably, the inaudible tone is not a zero frequency tone but instead is an inaudible high frequency of 30 kHz. If the weight being metered exceeds the desired value above the permitted tolerance, a warning signal with a frequency of 440 Hz is heard.

Weighing of a substance to a predetermined desired value is considerably facilitated by the above described acoustic indicator, since the operator, once having entered the desired weight value, can concentrate fully on metering the substance without referring to the optical display. The metering can proceed with high accuracy on a purely acoustic basis.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. In a scale having means for generating an electric weight signal signifying the weight of a quantity being metered, and means for entering a desired weight signal signifying the desired weight of said quantity, the improvement comprising means for receiving said electrical weight signal and said desired weight signal and generating a control signal varying in dependence on the difference therebetween; and electrically controllable tone signal generating means connected to said control signal generating means for generating audible signals having at least one controllable characteristic varying in accordance with said control signal and reaching a limiting value when said control signal signifies a zero difference between said electrical weight signal and said desired weight signal.

2. Apparatus as set forth in claim 1, wherein said scale has a data output furnishing said electrical weight signal; wherein said means for entering said desired weight signal comprises a console for operator-controlled entry of said desired weight signal; and wherein said control signal generating means comprises a microprocessor, and a data bus connecting said microprocessor to a data output of said electric scale.

3. Apparatus as set forth in claim 1, wherein said tone signal generating means comprises a programmable square wave generator having a digitally controllable period, a speaker, and means connecting said programmable square wave generator to said speaker.

4. Apparatus as set forth in claim 1, wherein said difference between said desired weight signal and said electrical weight signal varies over a predetermined range; and wherein changes in said characteristic value of said tone signal are limited to a predetermined part of said range.

5. Apparatus as set forth in claim 4, wherein said characteristic of said tone signal is the frequency thereof; and wherein said frequency decreases from an upper limiting value in accordance with decreases of the difference between said electrical weight signal and said desired weight signal, said frequency reaching an inaudible value when said difference passes through zero.

6. Apparatus as set forth in claim 5, wherein said changes of said frequency of said tone signal are stepwise changes.

7. Apparatus as set forth in claim 5, wherein said frequency of said tone signal is a predetermined constant frequency when said weight of said quantity being metered exceeds said desired weight.

8. In an electric scale having means for generating an electrical weight signal signifying the weight of a quantity being metered, and inputting means entering a desired weight signal signifying weight of said quantity, the improvement comprising means for receiving said electrical weight signal and said desired weight signal, said inputting means further including a console for operator-controlled entry of said desired weight signal, control signal generating means for creating a control signal varying in dependence on the difference between said electrical weight signal, and said desired weight signal, and including a microprocessor, and a data bus connecting said microprocessor to a data output of said electric scale, and electrically controllable tone signal generating means connected to said control signal generating means for generating audible signals having at least one controllable frequency varying in accordance with said control signal from an upper limiting value in accordance with any decrease of the difference between said electrical weight signal and said desired weight signal, and reaching a limiting value when said control signal signifies a zero difference between said electrical weight signal and said desired weight signal, and including a programmable square wave generator having a digitally controllable period, a speaker, and connecting means for connecting said programmable square wave generator to said speaker.

9. Apparatus as set forth in claim 8, wherein said difference between said desired weight signal and said electrical weight signal varies over a predetermined range, and wherein changes in said frequency of said tone signal are limited to a predetermined part of said range, said frequency reaching an inaudible value when said difference passes through zero.

10. Apparatus as set forth in claim 9, wherein said inaudible frequency value corresponds to a frequency sufficiently high so as to be inaudible to human ears.

11. Apparatus as set forth in claim 9, further comprising warning means emitting an audible warning signal when the weight being metered exceeds said desired value above a permitted weight tolerance.

* * * * *